United States Patent
Jungmann et al.

(10) Patent No.: US 7,198,061 B2
(45) Date of Patent: Apr. 3, 2007

(54) VALVE

(75) Inventors: Peter Jungmann, Rangendingen (DE); Matthias Knoell, Bad Urach (DE); Friedhelm Pfitzer, Rangendingen (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 364 days.

(21) Appl. No.: 10/733,356

(22) Filed: Dec. 18, 2003

(65) Prior Publication Data

US 2004/0118458 A1    Jun. 24, 2004

(30) Foreign Application Priority Data

Dec. 20, 2002    (DE) ................. 102 59 884

(51) Int. Cl.
*F16K 17/04* (2006.01)
*F16K 15/06* (2006.01)
*B01D 35/147* (2006.01)

(52) U.S. Cl. .................... 137/543; 137/515.5

(58) Field of Classification Search ............. 137/515, 137/515.5, 543; 210/130
See application file for complete search history.

(56) References Cited

U.S. PATENT DOCUMENTS

| | | | |
|---|---|---|---|
| 3,442,288 A * | 5/1969 | Scaramucci | ............ 137/515 |
| 5,139,043 A | 8/1992 | Hyde | |
| 5,404,907 A | 4/1995 | Benjey | |
| 5,695,633 A * | 12/1997 | Ernst et al. | ............ 210/130 |
| 6,644,624 B2 * | 11/2003 | Jainek | ............ 251/149.6 |

FOREIGN PATENT DOCUMENTS

| | | |
|---|---|---|
| DE | 2 105 315 | 8/1972 |
| DE | 195 02 020 | 8/1996 |
| DE | 200 09 766 | 11/2001 |
| DE | 201 08 856 | 11/2002 |
| EP | 0 463 289 | 1/1992 |
| GB | 2 375 973 A * | 12/2002 |
| WO | WO 02/051519 A1 * | 7/2002 |

* cited by examiner

*Primary Examiner*—Ramesh Krishnamurthy
(74) *Attorney, Agent, or Firm*—Paul Vincent

(57) ABSTRACT

Hydraulically or pneumatically controlled seat valve (2), in particular a pressure control valve, having a valve seat (10) formed in a base part (4) which cooperates with the sealing surface of a valve body (8) displaceably disposed in a cover part (6), wherein the base part (4) and the cover part (6) are connected to each other, the base part (4) having an at least sectionally circumferential collar (18) which faces radially outwardly for mounting the seat valve (2) to a further component (60), in particular to a housing, using a welded joint.

16 Claims, 3 Drawing Sheets

VALVE

This application claims Paris Convention priority of DE 102 59 884.4 filed Dec. 20, 2002 the complete disclosure of which is hereby incorporated by reference.

BACKGROUND OF THE INVENTION

The invention concerns a hydraulically or pneumatically controlled seat valve, in particular, a pressure control valve, comprising a valve seat formed in a base part which cooperates with a sealing surface of a valve body which is displaceably disposed in a cover part, wherein the base part and the cover part are connected to each other.

A valve of this type is disclosed e.g. in EP 0 463 289 B1. The valve has a base part of aluminum and a cover part of plastic material. The base part and the cover part are connected to each other via a jointed-flange connection. Towards this end, the base part of aluminum has a circumferential flanged edge which is flanged about an edge section of the cover part.

DE 201 08 856 U1 discloses a valve of this type whose base part and cover part are connected to each other via a locking connection.

The conventional valves may be disposed e.g. in an oil filter housing to form a filter bypass valve. When the oil filter is blocked, the valve opens to permit passage of unfiltered oil from the raw to the clean side of the filter, without being filtered. This ensures that a connected unit, such as e.g. a combustion engine, is supplied with oil even when the oil filter is blocked. Mounting of the valves, which are introduced in a housing through a pressing operation, is difficult. It is in particular problematic to guarantee uniform quality of the pressing operation and positionally accurate mounting of the valve in the housing under mass production conditions.

It is therefore the underlying purpose of the present invention to facilitate mounting of a valve of this type and to permit permanent positionally accurate installation of the valve in a housing.

SUMMARY OF THE INVENTION

This object is achieved in accordance with the invention in that the base part comprises an at least sectionally circumferential collar which faces radially outwardly and with which the seat valve can be mounted to a further component, in particular to a housing, via a welded joint.

Provision of a collar on the base part has the advantage that a reliable connection between the seat valve and a further component, e.g. a housing, is particularly simple. The proposed collar can be formed in one piece with the base part and be produced together with the base part e.g. through injection molding. Abutment of the collar on a section of the component to which or in which the valve is to be mounted, forms an exactly geometric plane of reference. This ensures that the valve assumes a defined position relative to the component and can be fixed in an exact position. Automated introduction of the valve to a component is also facilitated, since the valve can be initially inserted loosely into the component and does not have to be simultaneously pressed into a component opening with force, as is required e.g. in DE 201 08 856 U1. In contrast thereto, the valve is first precisely positioned and then is connected to the corresponding component.

Mounting of the valve by means of a welded joint ensures particularly reliable and permanent support of the valve on or in its installed location. Moreover, control of the process-relevant parameters is facilitated by welding, compared to a pressing operation.

When plastic material is used for the base part, cover part and valve body, the individual components can be produced in a particularly simple and inexpensive fashion. Moreover, disposal and/or recycling of the inventive seat valve are simple and effective.

The base part, cover part, and valve body are preferably made from the same plastic material. This ensures that the above-mentioned components of the seat valve have uniform properties, which is important e.g. in view of heat expansion when used in high-temperature surroundings. The base part, cover part and valve body can be made from polyamide, which is resistant to hydrolysis and oil. The use of the same plastic material also facilitates disposal and recycling of the seat valve.

The collar preferably has an annular surface. This annular surface forms a stop which can cooperate with a corresponding receptacle e.g. in a housing to exactly define the installation position of the seat valve. Structuring the collar as an annular surface is particularly advantageous to form a fluid-tight connection e.g. to a housing.

In a particularly advantageous fashion, the base part and/or the cover part are substantially rotationally symmetrical. The use of a collar which is mounted to the base part and is formed as an annular surface corresponding to the rotational symmetry of the base part, permits connection of the collar of the seat valve to a further component by rotational welding. This provides a particularly reliable and simple connection between the seat valve and e.g. a housing.

In an embodiment of the invention, the collar has a thickening to facilitate the welded joint. The collar serves not only to geometrically position the seat valve but also as material storage for producing the welded joint to mount the seat valve to a further component. The further component is e.g. also formed from plastic material, preferably from the same plastic material as the base part, such that the collar of the base part and the further component can be connected through welding without using any additional material. Suitable welding methods are e.g. vibration, rotational, ultrasonic, or laser welding methods.

In one embodiment of the invention, the cover part has locking sections which extend parallel to the incoming flow direction of the seat valve, wherein the front sides of the locking sections facing the flow direction are bevelled and the front sides facing away from the incoming flow direction are oriented perpendicular to the incoming flow direction. This embodiment of the locking sections facilitates the joining process between the base part and cover part, since the bevelled front sides of the locking sections permit gradual widening of the sections of the cover part connected to the locking sections during joining to the base part. The perpendicular orientation of the front sides facing away from the flow direction produces an undercut which reliably prevents release of the cover part from the base part.

In one embodiment of the invention, the base part has an at least sectionally circumferential bridge which extends radially outwardly and cooperates with front sides of the locking sections of the cover part which are oriented perpendicular to the incoming flow direction. This bridge forms the counter piece of the above-described undercut of the locking sections to prevent release of the cover part from the base part.

The base part and cover part preferably have mutually facing contact surfaces which are oriented substantially perpendicular to the incoming flow direction of the seat valve. These contact surfaces ensure exact mutual positioning of the base part and cover part such that the outer dimensions of the seat valve can vary only within a very narrow tolerance range. The mutually parallel contact surfaces may be formed on the base part e.g. by a correspondingly shaped shoulder and on the cover part e.g. by wall sections next to the locking sections to ensure that the base part and the cover part can abut each other over a large contact region. This ensures that the base part and cover part remain in a relative position defined by the contact surfaces even under pressure loads from the outside, thereby preventing setting or creeping processes.

In a further embodiment of the invention, the base part has locking receptacles for the locking sections of the cover part, wherein the receptacles are formed from wall sections which comprise a contact surface described above, joining flank surfaces which are adapted to the shape of the locking sections, and a joining bridge surface of a bridge, described above, which faces the front sides of the locking sections oriented perpendicular to the incoming flow direction. The contact surface, the flank surfaces and the bridge surface form a receiving space for the locking sections of the cover part. This receiving space is adapted to the geometry of the locking sections to provide a particularly reliable and stable connection between the base part and the cover part. The merging wall sections of the receiving space effect material continuity which is advantageous for the production of the base part using injection molding.

In accordance with an additional further development of the invention, the cover part has an at least sectionally circumferential shoulder which is radially inwardly offset and is suited for abutment on a further component, in particular, on a housing. The shoulder permits exact positioning of the cover part relative to the further component despite the unavoidable tolerances of the locking connection to the base part of the seat valve.

The shoulder is preferably disposed between a cover part section on the incoming flow side and a cover part section on the outgoing flow side, wherein the outer dimensions of the cover part on the incoming flow side are larger than the outer dimensions of the cover part on the outgoing flow side.

This particular embodiment allows the valve cover to be secured on a further component via the shoulder when fluid flow acts on the valve body, displaceably disposed in the cover part. The force generated by the fluid flow is thereby passed through the shoulder into the housing, after transmission through the valve body and the cover part. The forces are not passed via the locking sections of the cover part, via the locking receptacles of the base part, or via the base part, thereby load-relieving the locking connection. The locking connection may therefore be of correspondingly small size and design. This is advantageous in that material can be saved and the base part and cover part can be easily locked without requiring great force.

For a reliable load passage of the produced forces, at least sections of the shoulder are advantageously structured as an annular surface, which is oriented perpendicular to the flow direction of the seat valve. This arrangement also ensures that the position of the cover part relative to a further component is defined with particular precision.

In an additional further development of the invention, the valve body is guided in a cylindrical guidance which is formed in the cover part and which is open at the front side. A guidance of this type is known in principle from the above-mentioned EP 0 463 289 B1. The cylindrical guidance therein is, however, closed and dirt particles in the fluid may collect therein. Such a collection is effectively prevented by the open cylindrical guidance. This is particularly advantageous when the seat valve is used as a pressure control valve in oil filter arrangements.

The base part and the cover part advantageously have a cylindrical outer shape, at least in the region where their contact surfaces abut. This embodiment permits particularly easy insertion of the seat valve in a further component, e.g. in a cylindrical receptacle of a housing.

Guiding elements for the valve body are advantageously disposed on or in the base part next to the valve seat and about the periphery of a circle. The guiding elements which are formed e.g. as projections, permit reliable return of the valve body into its resting position after deflection by an increased fluid pressure. To support this process, bevelled guiding surfaces may be provided on the projections on the side facing the valve body.

At least three guiding elements are required which subtend, in total, an angle of more than 180 degrees. 4 to 8 guiding elements are preferably uniformly disposed about the valve body. To prevent flow losses, free spaces are advantageously provided between the guiding elements. The guiding elements advantageously extend in the flow direction by at least the amount which corresponds to the maximum stroke of the valve body.

The invention also concerns an arrangement comprising a seat valve and a component on or in which the seat valve is disposed, wherein the seat valve and the component are permanently welded to each other. This arrangement permits production of a pre-mounted assembly which may be provided as unit for a further mounting process. A seat valve in accordance with the invention, as described above, is preferably used as the seat valve.

Suitable welding methods are the above-mentioned vibration, rotational, ultrasonic or laser welding methods. Such methods provide a fluid-tight connection between the base part of the seat valve and a further component to prevent leakage and passage of fluid past the seat valve. This also ensures that fluid flow through the seal, fashioned between valve body and valve seat, can be completely interrupted. When the valves are pressed in as in DE 201 08 856 U1, leakages between the pressed parts may occur, in particular, due to high temperature changes.

Reliable function of the seat valve and prevention of leakage flows is also important when the component connected to the seat valve is formed as, housing, central tube or lid, in particular of an oil filter as described e.g. in DE 195 02 020 C2. The welded joint effectively prevents such leakage.

In one embodiment of the invention, the component has a receptacle into which the seat valve can be loosely inserted in a pre-mounting position. Such a receptacle permits reliable definition of the relative position between the seat valve and the further component. The at least partial interposing of seat valve and component moreover provides a particularly compact unit.

The receptacle advantageously has an abutment section for abutment of the collar of the seat valve described above. This abutment section represents the counter piece of the collar disposed on the base part of the seat valve. When the valve is pre-mounted, the collar is initially loosely supported on the abutment section before the collar and the abutment section are welded to each other. The collar may therefore be largely flat and excessive material (e.g. in the form of a thickening) may be provided on the abutment section of the housing for producing a welded joint between the base part and e.g. the housing.

It is also advantageous when the receptacle has a step which cooperates with the shoulder provided on the cover part. This ensures reliable positioning of the cover part in the housing.

The abutment section and the step preferably have surfaces which are perpendicular to the incoming flow direction of the seat valve, the surfaces being disposed parallel to the contact surfaces of the base part and the cover part of the seat valve. This embodiment permits transfer of forces, introduced into the shoulder of the cover part, via the contact surface of the cover part onto the contact surface of the base part and on to the abutment section of a housing. The mutually parallel surfaces which are all disposed perpendicular to the incoming flow direction of the seat valve permit particularly effective passage of force flow.

In a particularly advantageous fashion, the separation between the surfaces of the abutment section perpendicular to the incoming flow direction of the seat valve and the step is at least slightly less than the separation between the surface of the collar of the base part facing the incoming flow direction of the seat valve and the shoulder of the cover part. This ensures relief of the locking connection disposed between the step of the cover part and the collar of the base part. The fact that the separation between the abutment section and the step in the receptacle of the component receiving the seat valve is slightly smaller, the entire seat valve and, in particular, the region between collar and shoulder in which the locking connection is disposed, is pretensioned thereby relieving the locking connection which is loaded when fluid flow is present.

It may also be advantageous when the separation between the surfaces of the abutment section which are perpendicular to the incoming flow direction of the seat valve and the step is at least slightly larger than the separation between the surface of the collar of the base part facing the incoming flow direction of the seat valve and the step of the cover part. As long as the locking connection between the shoulder of the cover part and the collar of the base part is intact, the base part and cover part are held together via this locking connection. If the locking connection should fail, the base part is still fixed on the abutment section of the installation position while the cover part may be supported with its shoulder on the step provided at the installation position, thereby maintaining full function of the valve even when the locking connection fails.

Further advantageous embodiments and details of the invention can be extracted from the following description which describes and explains the invention in more detail with reference to the embodiment shown in the drawing.

DESCRIPTION OF THE PREFERRED EMBODIMENT

Figure 1:
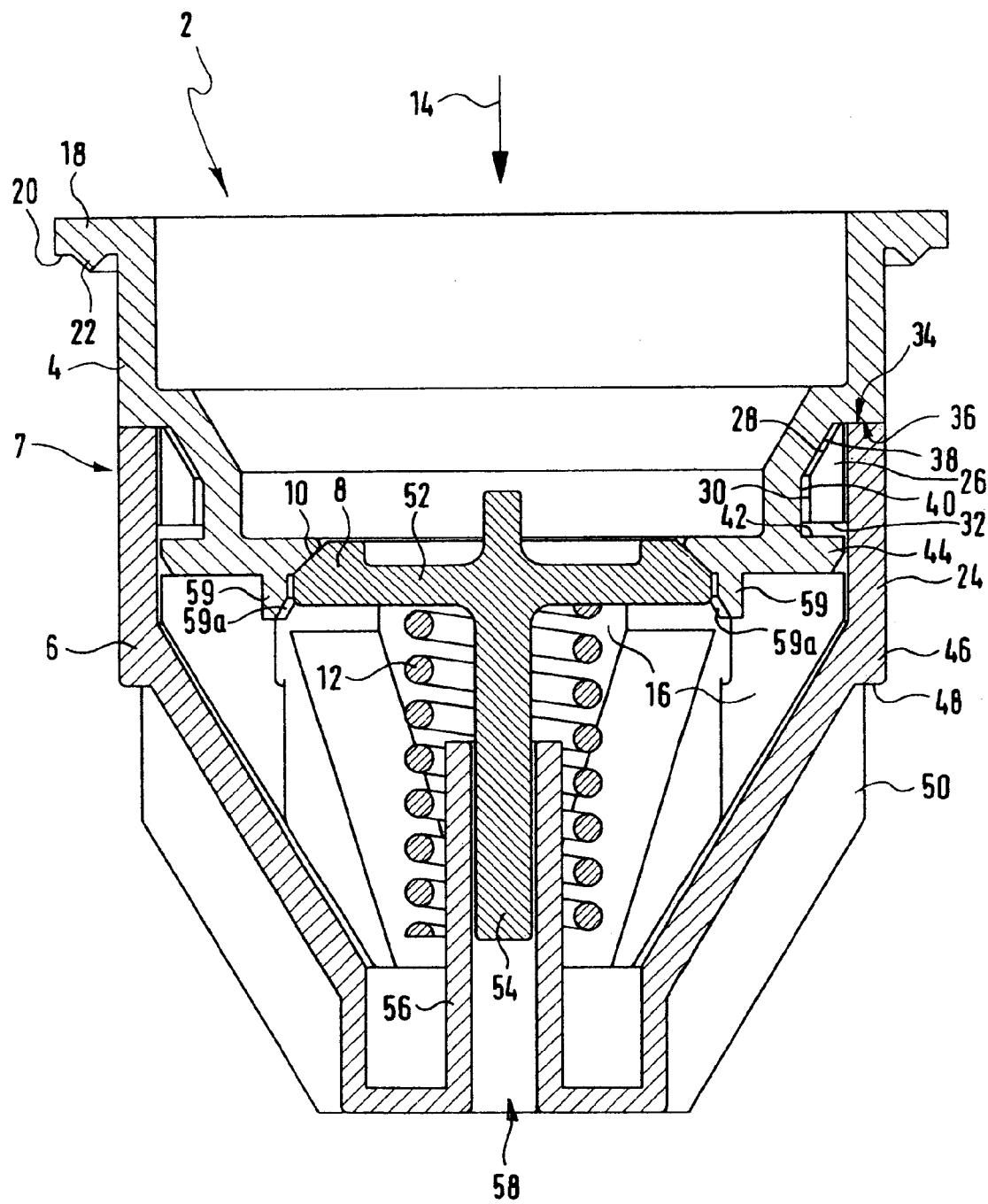
FIG. 1 shows a cross-sectional side view of an inventive seat valve.

In accordance with FIG. 1, a seat valve is designated in its totality with reference numeral 2. The seat valve 2 consists substantially of a base part 4 shown at the top of FIG. 1 and a cover part 6 shown at the bottom of FIG. 1. The base part 4 and the cover part 6 are connected to each other via a locking connection 7, which is described in more detail below.

A valve body 8 is displaceably disposed in the cover part 6, and cooperates with a valve seat 10 formed on the base part 4. The valve body 8 is held in the position shown in FIG. 1 by means of a spring element 12 supported on the cover part 6. When fluid enters in accordance with the incoming flow direction 14 and the holding force generated by the spring element 12 is overcome, the valve body 8 can be moved downwardly (as viewed in the drawing) away from the valve seat 10 and incoming fluid can escape through outlet openings 16 provided in the cover part 6.

The base part 4 of the seat valve 2 has a collar 18 on its front side facing the flow direction 14, which has an annular shape and has a collar surface 20 on the side facing away from the incoming flow direction 14 which also has a peripheral thickening 22. The collar surface 20 serves as abutment surface for a component described with reference to FIG. 2, wherein the thickening 22 serves as material storage for producing a welded joint.

The locking connection 7 formed between the base part 4 and the cover part 6 is described in more detail below. The cover part 6 has locking arms 24 on its side facing the base part 4 with radially inner locking sections 26. The locking sections 26 have bevelled front surfaces 28 on their side facing the incoming flow direction 14 which are joined by side surfaces 30 which extend parallel to the flow direction 14. The side surfaces 30 are joined by front surfaces 32 which are oriented perpendicular to the flow direction 14.

The locking arms 24 have a contact surface 34 on the front side facing the base part 4 which are oriented substantially perpendicular to the incoming flow direction 14. The contact surfaces 34 are plane-parallel to the contact surfaces 36 provided on the base part 4.

The contact surface 36 of the base part 4 is joined by a first inclined flank surface 38 and a second flank surface 40 which is oriented parallel to the incoming flow direction 14. The flank surface 40 is again joined by a bridge surface 42 which is oriented perpendicular to the incoming flow direction and which is formed by a bridge 44 which is disposed at the same height as the valve seat 10, viewed in the incoming flow direction. The contact surface 36, the flank surfaces 38 and 40 and the bridge surface 42 form a receiving space for the locking sections 26 on the locking arms 24 of the cover part 6.

The locking arm can be gradually pushed radially outwardly by the bevelled front surface 28 when the cover part 6 is mounted to the base part 4, until the front surface 32 of the locking section 26 which is oriented perpendicular to the incoming flow direction 26 comes into engagement behind the bridge surface 42 of the bridge 44. This construction ensures simple mounting of the cover part 6 to the base part 4. Moreover, the perpendicular orientation of the front surface 32 and the bridge surface 42 ensures that the cover part 6 cannot be removed from the base part 4.

The locking arms 24 of the cover part 6 form a cover part section 46 on the incoming flow side which is delimited by a radially inwardly offset shoulder 48. The shoulder 48 is joined, viewed in the flow direction, by the cover part section 50 on the flow discharge side which has smaller outer dimensions than the cover part section 46 on the incoming flow side. The shoulder 48 serves for abutment on a step provided in a further component, as is explained in more detail with reference to FIG. 2.

The valve body 8 consists essentially of one valve disk 52 whose edge has a conical section facing the flow direction 14 which cooperates with a correspondingly formed conical section of the valve seat 10 in the base part 4. The valve body 8 has a central piston-like extension 54 on its side facing away from the incoming flow direction 14. The extension 54 engages in a cylindrical guidance 56 provided in the cover part 6 which has an opening 58 on the front side at the flow discharge side. This opening prevents collection of dirt particles in the guidance 56 of the extension 54.

Guiding elements 59 for the valve disk 52 are formed as projections disposed adjacent to the valve disk 52 along a circular periphery. FIG. 1 shows a section of two elements of the total of six guiding elements 59. They have guiding bevels 59a on the side facing the valve disk 52.

Figure 2:
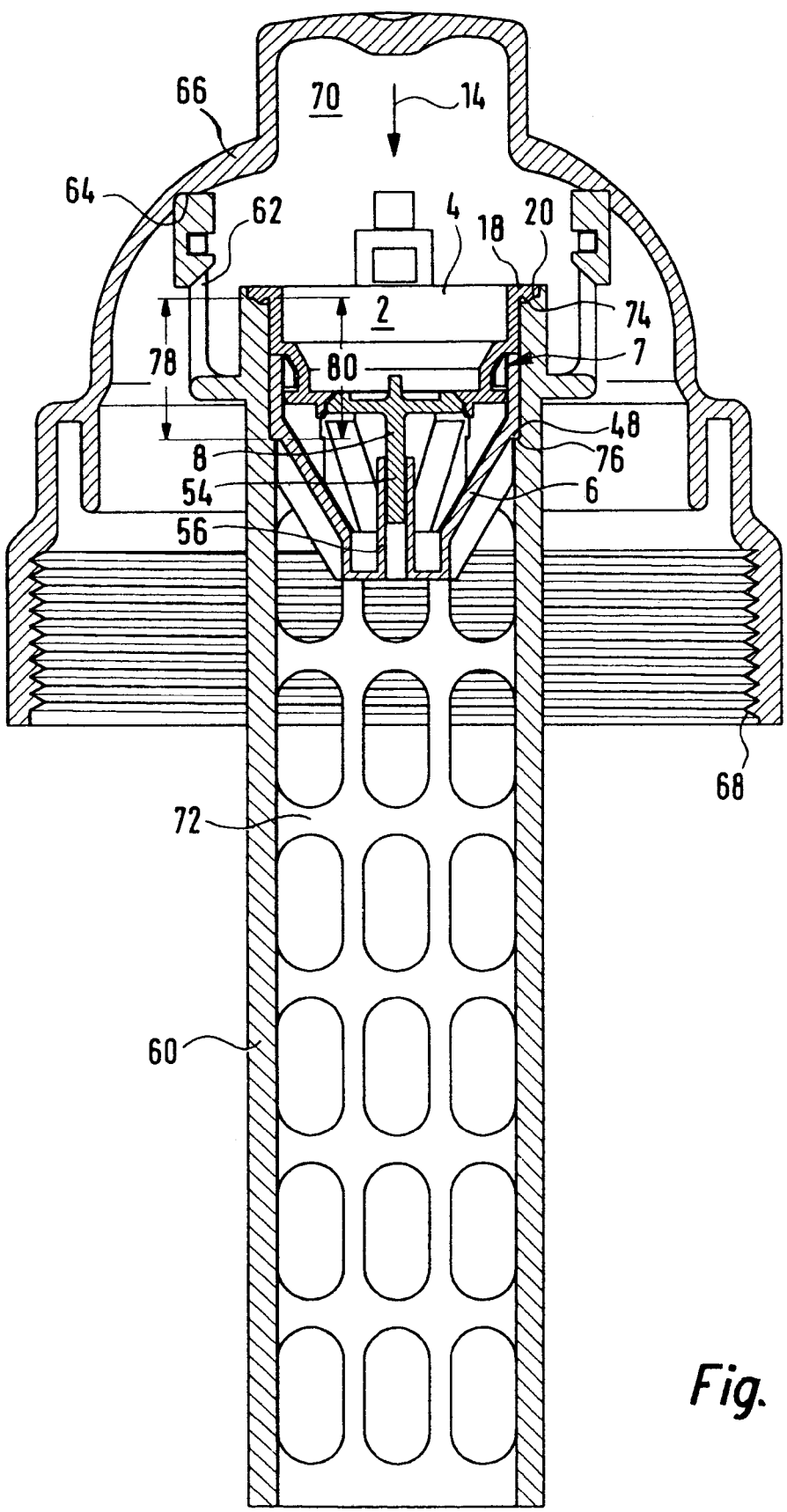
FIG. 2 shows a cross-sectional side view of a seat valve installed in an oil filter arrangement.

The seat valve 2 is shown in a possible installation position in FIG. 2. The seat valve 2 is mounted in a component in the form of a central tube 60 of an oil filter arrangement, wherein the central tube 60 is mounted via locking arms 62 in locking receptacles 64 which are provided on a lid 66. The lid 66, central tube 60, and seat valve 2 can be inserted in and mounted to an oil filter housing (not shown) via a screw thread 68 provided in the lid 66. The seat valve 2 separates a high-pressure space 70 on the lid side from a low pressure space 72 located inside the central tube 60 in the situation shown in FIG. 2. The seat valve 2 is fixed via the collar 18 of the base part 4 to an abutment section 74 which is provided on the front side of the central tube 60 facing the high-pressure space 70.

The seat valve 2 is welded to the abutment section 74 of the central tube 60 via the collar 18 and the thickening 22, shown in more detail in FIG. 1. Since the seat valve 2 and the central tube 60 are substantially rotationally symmetrical, the seat valve 2 and the central tube 60 can be connected to each other through a rotational welding method.

The central tube 60 has a step 76, viewed from the abutment section 74 in the flow direction 14, on which the shoulder 48 of the cover part 6 abuts. The step 76 exactly defines the position of the cover part 6 of the seat valve 2 within the central tube 60. The separation 78 between the abutment section 74 and the step 76 is slightly smaller than the separation 80 between the collar surface 20 of the collar 18 and the shoulder 48 of the valve cover 6. The arrangement of base part 4 and cover part 6 is thereby pretensioned which relieves the locking connection 7 between base part 4 and cover part 6.

When fluid flows towards the seat valve 2 in the incoming flow direction 14, the valve body 8 can be displaced in the flow direction such that the extension 54 is further immersed into the cylindrical guidance 56 in the cover part 6. The valve body is thereby supported by a spring element 12 (shown in FIG. 1). The spring element 12 is, in turn, supported on the cover part 6 which can relieve the forces produced by the flow through the shoulder 48 into the central tube 60. The forces are no longer deflected into the central tube 60 via the cover part 6, the locking connection 7, the base part 4 and the collar 18. Consequently, the locking connection 7 is relieved and the high functional safety of the inventive seat valve 2 is improved.

Figure 3:
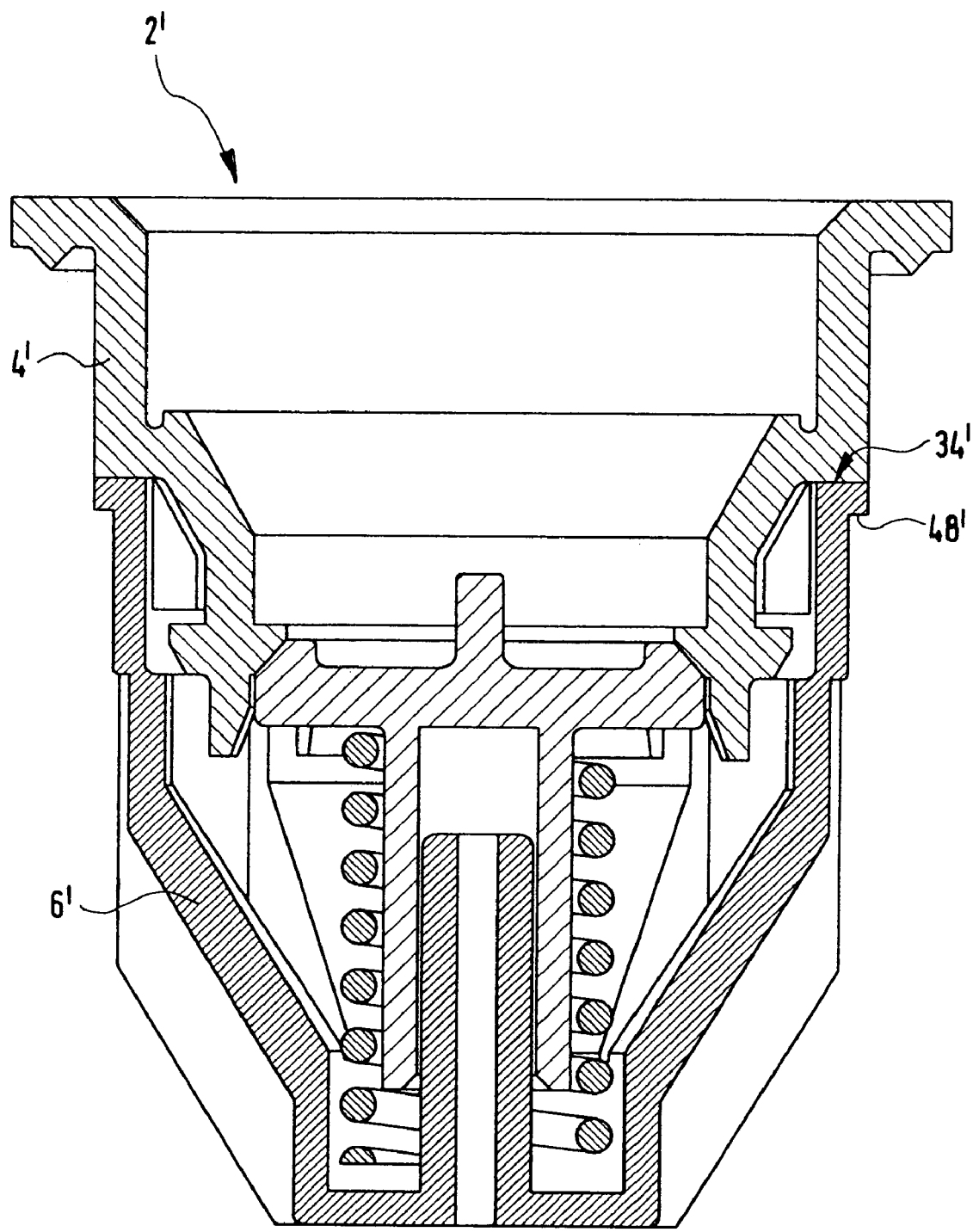
FIG. 3 shows a cross-sectional side view of a further inventive seat valve.

The seat valve 2' shown in FIG. 3 comprises a base part 4' and a cover part 6' The seat valve 2' differs from the seat valve 2 of FIG. 1 in that the separation between a contact surface 34' and a shoulder 48' is relatively small: in the embodiment, the separation corresponds approximately to the thickness of the wall sections of the cover part 6' extending in the flow direction. This is advantageous in that a component may have a relatively shallow bore for receiving the seat valve 2' s to form a step for abutment on the shoulder 48' (compare the separation 78 between the abutment section 74 and the step 76 of FIG. 2).

We claim:

1. A hydraulically or pneumatically controlled seat valve or pressure control seat valve for mounting to a further component or housing, the valve comprising:
    a base part defining a valve seat, said base part having a radially outward projecting collar extending about at least a portion of a circumference of said base part, said collar structured to support a joint disposed at said collar to mount the valve to the further component;
    a cover part connected to said base part; and
    a valve body displaceably disposed in said cover part, said valve body having a sealing surface cooperating with said valve seat of said base part to close the valve, wherein said cover part comprises a radially inwardly offset and an at least sectionally circumferential shoulder which is suited for abutment to the further component, wherein said shoulder is disposed between a first cover part section proximate an incoming flow side and a second cover part section proximate an outgoing flow side, wherein outer dimensions of said first cover part section on said incoming flow side are larger than outer dimensions of said second cover part section on said outgoing flow side, wherein said cover part has locking sections which extend parallel to an incoming flow direction of the seat valve, wherein front sides of said locking sections facing said incoming flow direction are bevelled and end sides facing away from said incoming flow direction are oriented perpendicular to said flow direction.

2. The seat valve of claim 1, wherein said collar has an annular surface.

3. The seat valve of claim 1, wherein said collar is structured for loose insertion into a receptacle of the further component in a pre-mounting position.

4. The seat valve of claim 1, wherein said collar has a thickening to facilitate a welded joint.

5. The seat valve of claim 1, wherein at least one of said base part and said cover part is substantially cylindrically symmetrical.

6. The seat valve of claim 1, wherein a welded joint is produced through one of vibration welding, rotational welding, ultrasonic welding, and laser welding.

7. The seat valve of claim 1, wherein said base part has an at least sectionally circumferential bridge which extends radially outwardly to cooperate with said end sides of said locking sections of said cover part.

8. The seat valve of claim 7, wherein said base part and said cover part have facing contact surfaces which are oriented substantially perpendicular to said incoming flow direction of the seat valve.

9. The seat valve of claim 8, wherein said base part has locking receptacles for said locking sections of said cover part, wherein said receptacles are formed from wall sections comprising said base part contact surfaces, joining flank surfaces adjusted to a shape of said locking sections, and joining bridge surfaces of said bridge, said bridge surfaces facing said end sides of said locking sections.

10. The seat valve of claim 1, wherein at least sections of said shoulder define an annular surface which is oriented perpendicular to said incoming flow direction of the seat valve.

11. The seat valve of claim 1, wherein said valve body is guided in a cylindrical guidance formed in the cover part which is open at an end thereof.

12. The seat valve of claim 8, wherein an outer contour of said base part and an outer contour of said cover part are cylindrical at least in a region in which said contact surfaces abut.

13. The seat valve of claim 1, wherein guiding elements for said valve body are provided on or in said base part along a substantially circular periphery thereof proximate said valve seat.

14. A seat valve system for a hydraulically or pneumatically controlled seat valve or pressure control seat valve, the valve system comprising:
   a seat valve base part defining a valve seat, said base part having a radially outward projecting collar extend about at least a portion of a circumference of said base part;
   a cover part connected to said base part;
   a valve body displaceably disposed in said cover part, said valve body having a sealing surface cooperating with said valve seat of said base part to close the valve;
   a component structured to accept the valve; and
   a joint integral with said collar and said component to permanently connect the valve to said component at said collar, wherein said cover part comprises a radially inwardly offset and an at least sectionally circumferential shoulder which is suited for abutment to the further component, wherein said shoulder is disposed between a first cover part section proximate an incoming flow side and a second cover part section proximate an outgoing flow side, wherein outer dimensions of said first cover part section on said incoming flow side are larger than outer dimensions of said second cover part section on said outgoing flow side, wherein said component has a receptacle in which the seat valve can be loosely inserted in a premounted position, said receptacle comprising an abutment section communicating with said collar, said receptacle also having a step which cooperates with said shoulder defined on a peripheral portion of said cover part, wherein said abutment section and said step have surfaces perpendicular to said flow direction of the seat valve and parallel to contact surfaces between said base part and said cover part, a separation between a surface of said abutment section, which is perpendicular to an incoming flow direction of the seat valve, and said step being slightly smaller than a separation between a surface of said collar facing said incoming flow direction of the seat valve and said shoulder.

15. The system of claim 14, wherein said component is one of a housing, a central tube, a lid, an oil filter housing, an oil filter central tube, and an oil filter lid.

16. A seat valve system for a hydraulically or pneumatically controlled seat valve or pressure control seat valve, the valve system comprising:
   a seat valve base part defining a valve seat, said base part having a radially outward projecting collar extend about at least a portion of a circumference of said base part;
   a cover part connected to said base part;
   a valve body displaceably disposed in said cover part, said valve body having a sealing surface cooperating with said valve seat of said base part to close the valve;
   a component structured to accept the valve; and
   a joint integral with said collar and said component to permanently connect the valve to said component at said collar, wherein said cover part comprises a radially inwardly offset and an at least sectionally circumferential shoulder which is suited for abutment to the further component, wherein said shoulder is disposed between a first cover part section proximate an incoming flow side and a second cover part section proximate an outgoing flow side, wherein outer dimensions of said first cover pert section on said incoming flow side are larger than outer dimensions of said second cover part section on said outgoing flow side, wherein said component has a receptacle in which the seat valve can be loosely inserted in a premounted position, said receptacle comprising an abutment section communicating with said collar, said receptacle also having a step which cooperates with said shoulder defined on a peripheral portion of said cover part, wherein said abutment section and said step have surfaces perpendicular to said flow direction of the seat valve and parallel to contact surfaces between said base part and said cover part, a separation between a surface of said abutment section, which is perpendicular to a flow direction of the seat valve, and said step being slightly larger than a separation between a surface of said collar facing said flow direction of the seat valve and said shoulder.

* * * * *